US010364537B2

United States Patent
Hong et al.

(10) Patent No.: US 10,364,537 B2
(45) Date of Patent: Jul. 30, 2019

(54) CONSTRUCTING APPARATUS AND METHOD OF GUIDE LINE FOR ROAD

(71) Applicant: KOREA EXPRESSWAY CORP., Gimcheon-si, Gyeongsangbuk-do (KR)

(72) Inventors: Doo-pyo Hong, Gwacheon-si (KR); Doo-haeng Lee, Gwangju (KR); Geon Cheol Seo, Suwon-si (KR); Hong-kwan Seo, Gwangju (KR); Kyung Ju Lee, Gwangju (KR)

(73) Assignee: KOREA EXPRESSWAY CORP., Gyeongsangbuk-Do (KR)

( * ) Notice: Subject to any disclaimer, the term of this patent is extended or adjusted under 35 U.S.C. 154(b) by 0 days.

(21) Appl. No.: 15/903,748

(22) Filed: Feb. 23, 2018

(65) Prior Publication Data

US 2019/0093295 A1   Mar. 28, 2019

(30) Foreign Application Priority Data

Sep. 25, 2017 (KR) .......................... 10-2017-0123277

(51) Int. Cl.
*E01C 23/22* (2006.01)
*B60P 3/30* (2006.01)
*B05B 7/08* (2006.01)

(52) U.S. Cl.
CPC .......... *E01C 23/222* (2013.01); *B05B 7/0884* (2013.01); *B60P 3/30* (2013.01)

(58) Field of Classification Search
CPC .... E01C 23/22; E01C 23/0993; E01C 23/163; E01C 23/166; E01C 23/222; B05B 13/005; B05B 12/002; B62D 63/02
See application file for complete search history.

(56) References Cited

U.S. PATENT DOCUMENTS

| 4,893,751 A * | 1/1990 | Armstrong | E01C 23/22 118/305 |
| 5,203,923 A * | 4/1993 | Hartman | B05B 9/06 118/323 |
| 7,611,076 B1 * | 11/2009 | Street | B05B 9/007 239/176 |
| 2003/0168834 A1 * | 9/2003 | Ulrich | E01C 23/222 280/727 |
| 2004/0057795 A1 * | 3/2004 | Mayfield | A63C 19/06 404/84.05 |

(Continued)

FOREIGN PATENT DOCUMENTS

KR    10-0721510    5/2007
KR    10-2010-0073465    7/2010

(Continued)

*Primary Examiner* — Abigail A Risic

(74) *Attorney, Agent, or Firm* — Allen, Dyer, Doppelt + Gilchrist, P.A.

(57) ABSTRACT

An apparatus is for constructing a guide line for a road. The apparatus includes a painting apparatus part that stores a lane paint, is driven by receiving power, and supplies the lane paint. A nozzle part is installed in the painting apparatus part and sprays the lane paint supplied from the painting apparatus part on a road to form a guide line for a road including at least one of a directional mark and a lane. An adjustment part is installed in the painting apparatus part and adjusts at least one of a location and an interval of the lane paint sprayed from the nozzle part.

4 Claims, 3 Drawing Sheets

(56) References Cited

U.S. PATENT DOCUMENTS

| | | | | |
|---|---|---|---|---|
| 2008/0228294 A1* | 9/2008 | Nielsen | ............... | G01C 15/02 |
| | | | | 700/58 |
| 2009/0185858 A1* | 7/2009 | Malit | ............... | B60G 17/00 |
| | | | | 404/75 |
| 2010/0189887 A1* | 7/2010 | Nielsen | ............... | G06Q 10/06 |
| | | | | 427/136 |
| 2010/0272885 A1* | 10/2010 | Olsson | ............... | B65D 83/203 |
| | | | | 427/137 |
| 2011/0057052 A1* | 3/2011 | Heatley | ............... | A63C 19/065 |
| | | | | 239/71 |
| 2012/0072035 A1* | 3/2012 | Nielsen | ............... | B05B 12/004 |
| | | | | 700/283 |
| 2014/0120251 A1* | 5/2014 | Grimm | ............... | E01C 23/222 |
| | | | | 427/137 |
| 2015/0097054 A1* | 4/2015 | Schroeder | ............... | E01C 23/22 |
| | | | | 239/172 |
| 2015/0330039 A1* | 11/2015 | Vanneman | ............... | E01C 23/163 |
| | | | | 404/94 |
| 2015/0352570 A1* | 12/2015 | Lins | ............... | E01C 23/22 |
| | | | | 239/146 |
| 2015/0361968 A1* | 12/2015 | Schroeder | ............... | F04B 13/02 |
| | | | | 417/53 |
| 2016/0002868 A1* | 1/2016 | McGuffie | ............... | A63C 19/065 |
| | | | | 427/137 |
| 2017/0204571 A1* | 7/2017 | Shultz | ............... | E01C 23/22 |
| 2017/0204572 A1* | 7/2017 | Kuczenski | ............... | E01C 23/22 |

FOREIGN PATENT DOCUMENTS

| KR | 10-1161144 | 6/2012 |
|---|---|---|
| KR | 10-2017-0070918 | 6/2017 |

* cited by examiner

CONSTRUCTING APPARATUS AND METHOD OF GUIDE LINE FOR ROAD

CROSS-REFERENCE TO RELATED APPLICATIONS

This application claims the priority of Korean Patent Application No. 10-2017-0123277 filed on Sep. 25, 2017, in the Korean Intellectual Property Office, the disclosure of which is incorporated herein by reference.

BACKGROUND

Field

The present disclosure relates to an apparatus and a method of constructing a guide line for a road and more particularly, to an apparatus and a method of constructing a guide line for a road implemented to print a guide line for a road formed by a directional mark and a lane for pre-indicating a route in a specific direction at a time.

Description of the Related Art

A guide line for a road is a bright-colored guide line installed to pre-indicate a route in a specific direction at a crossroad such as a junction and an interchange. When the forked lane is in one direction, the color is marked by pink and when the forked lane is in two directions, the colors are marked by pink and green. It is known that a driver pre-checks an advance route through the marking and provides for the advance route to not only easily select a crossroad route of the driver but also prevent traffic accidents.

Generally, in the painting for marking a lane or a crosswalk on a road surface, there are a fusion type painting apparatus that adds a raw material mixture including a powdery solid resin composition, a pigment having a required color, and the like in a container and heats the mixture while mixing to apply and fuse the mixture on a road surface in a molten state and a spray type painting apparatus that sprays a molten paint on a road surface by internal pressure.

Herein, in the fusion type lane, the painting is performed by applying the entire surface with a predetermined width without unevenness, but the driving safety is lacking due to the slip caused by hydroplaning in case of rain. In addition, since the durability is deteriorated, the vehicle wears easily due to traveling of the vehicle, and thus there is a disadvantage of shortening the lifespan early. In addition, it is difficult to secure visibility of the driver due to the hydroplaning during day and night and in the case of rain, and recently, construction has been performed by forming the unevenness in a pattern shape.

In general, as the raw material used for marking the lane, a paint or two-component paint, that is, a paint obtained by mixing a curing agent with an acrylic resin, a thermoplastic resin, and the like are used and mixed by a mixer provided in a raw material container.

The painting apparatus for marking the lane having the aforementioned configuration performs construction using a large-sized vehicle equipped with various apparatuses such as a raw material container and a burner and construction of manually moving a transporter. As a result, a thickness of the lane is different because a moving speed of the transporter is not uniform.

In addition, there is a problem that workability is lowered due to inconvenience of work according to movement of the transporter, and poor construction of the lane is caused. In addition, the marking of the lane using the large-sized vehicle is advantageous in terms of workability by the spray type using internal pressure, but there is a problem that it is impossible to construct the road on a narrow road.

PATENT DOCUMENT (Patent Document 1) Korean Registered Patent No. 10-0721510

(Patent Document 2) Korean Patent Laid-open Publication No. 10-2017-0070918

SUMMARY

An object to be achieved by the present disclosure is to provide an apparatus and a method of constructing a guild line for a road implemented to paint a guild line for a road formed by a directional mark and a lane for indicating a progress direction of a vehicle at a time.

However, other technical objects desired to be achieved in the present disclosure are not limited to the aforementioned objects, and other technical objects not described above will be apparent to those skilled in the art from the disclosure of the present disclosure.

According to an aspect of the present disclosure, there is provided an apparatus of constructing a guide line for a road, the apparatus including: a painting apparatus part that stores a lane paint, is driven by receiving power, and supplies the lane paint; a nozzle part that is installed in the painting apparatus part and sprays the lane paint supplied from the painting apparatus part to form a guide line for a road including at least one of a directional mark and a lane; and an adjustment part that is installed in the painting apparatus part and adjusts at least one of a location and an interval of the lane paint sprayed from the nozzle part.

In one embodiment, the nozzle part may include a first nozzle member that is installed at one side of the painting apparatus part and receives and sprays a first lane paint from the painting apparatus part to form a lane; and a second nozzle member that is installed at the other side of the painting apparatus part and receives a second lane paint from the painting apparatus part and sprays the second lane paint on the lane to form the directional mark and form the guide line for the road.

In one embodiment, the second nozzle member may form a directional mark having a ">" or "<" shape.

In one embodiment, the adjustment part may preset an interval at which the second lane paint is sprayed from the second nozzle member so that the directional mark is formed at a predetermined interval.

In one embodiment, the adjustment part may preset a time at which the second lane paint is sprayed from the second nozzle member so that the directional mark is formed at a predetermined interval.

In one embodiment, the second nozzle member may provide at least two nozzles.

According to another aspect of the present disclosure, there is provided a method of constructing a guide line for a road including: a first step in which a painting apparatus part is driven by receiving power to supply a lane paint to a nozzle part; a second step in which an adjustment part adjusts at least one of a location and an interval of the lane paint sprayed from the nozzle part; and a third step in which the nozzle part sprays the lane paint supplied from the painting apparatus part on a road to forma guide line for a road including at least one of a directional mark and a lane.

In one embodiment, the nozzle part may include a first nozzle member and a second nozzle member, and the third step may include a step 3-1 in which the first nozzle member sprays a first lane paint to form the lane; and a step 3-2 in which the second nozzle member sprays a second lane paint to form the directional mark and form the guide line for the road.

In one embodiment, the adjustment part may preset an interval at which the second lane paint is sprayed from the second nozzle member so that the directional mark is formed at a predetermined interval.

In one embodiment, the adjustment part may preset a time at which the second lane paint is sprayed from the second nozzle member so that the directional mark is formed at a predetermined interval.

According to the present disclosure, an apparatus and a method of constructing a guide line for a road implemented to print a guide line for a road formed by a directional mark and a lane for pre-indicating a route in a specific direction at a time are provided to secure a stable ejection amount, thereby improving quality of the guide line for the road.

Further, the lane and the directional mark to which the vehicle is gone may be painted at the same time, thereby shortening a construction time and a breaking time, minimizing inconvenience of the user, and reducing factors of workplace accidents.

However, effects which can be obtained in the present disclosure are not limited to the aforementioned effects and other unmentioned effects will be clearly understood by those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The present disclosure will be described more fully hereinafter with reference to the accompanying drawings, in which exemplary embodiments of the invention are shown. However, the description of the present disclosure is just an example for structural or functional description, and the scope of the present disclosure should not be construed as being limited by the exemplary embodiments described in the specification. That is, since the exemplary embodiments can be variously modified and have various forms, the scope of the present disclosure should be understood to include equivalents capable of realizing technical ideas. Further, since it is not construed that a specific exemplary embodiment should include all of objects or effects proposed in the present disclosure or only the effects, it should not be understood that the scope of the present disclosure is limited thereto.

Hereinafter, configurations of preferred exemplary embodiments of the present disclosure will be described in detail with reference to the accompanying drawings.

Figure 1:
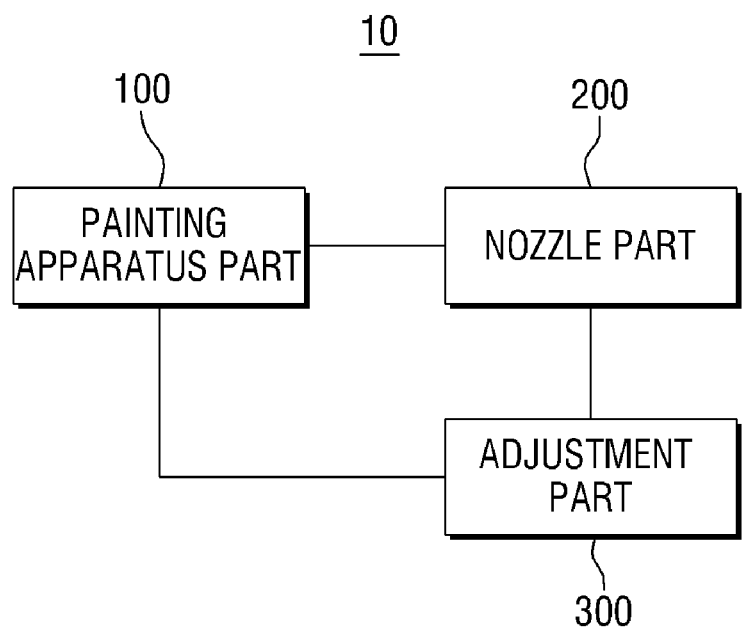
FIG. 1 is a block diagram for describing an apparatus of constructing a guide line for a road according to an exemplary embodiment of the present disclosure.
Figure 2:
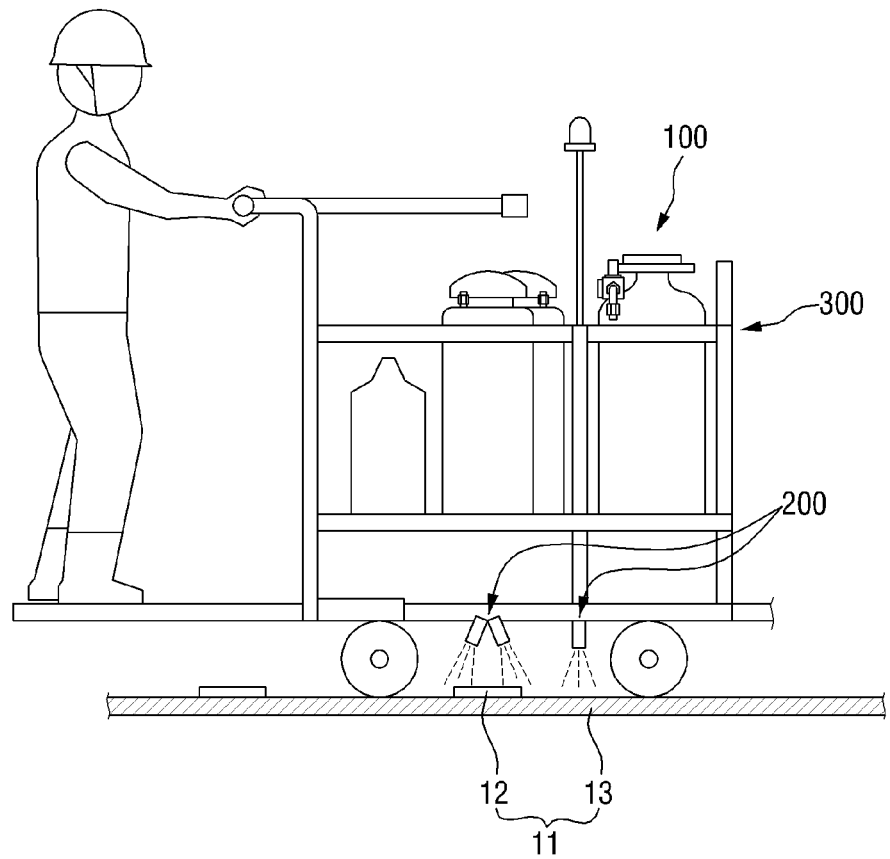
FIG. 2 is a side view for schematically describing the apparatus of constructing the guide line for the road according to the exemplary embodiment of the present disclosure.

FIG. 1 is a block diagram for describing an apparatus of constructing a guide line for a road according to an exemplary embodiment of the present disclosure and FIG. 2 is a side view for schematically describing the apparatus of constructing the guide line for the road according to the exemplary embodiment of the present disclosure. Referring to FIGS. 1 and 2, an apparatus 10 of constructing a guide line of a road includes a painting apparatus part 100, a nozzle part 200, and an adjustment part 300.

The painting apparatus part 100 stores a lane paint, is driven by receiving power, and supplies the lane paint to the nozzle part 200. The painting apparatus part 100 receives interval information from the adjustment part 300 to supply the lane paint (preferably, a second lane paint) to the nozzle part 200 (preferably, a second nozzle member 220) according to the corresponding received interval information. The painting apparatus part 100 receives time information from the adjustment part 300 to supply the lane paint (preferably, the second lane paint) to the nozzle part 200 (preferably, the second nozzle member 220) at every time according to the corresponding received time information.

The nozzle part 200 is installed in the painting apparatus part 100 and sprays the lane paint supplied from the painting apparatus part 100 on the road to form a guide line 11 for the road including at least one of a directional mark 12 and a lane 13.

The adjustment part 300 is installed in the painting apparatus part 100 to adjust at least one of a location and an interval of the lane paint sprayed from the nozzle part 200. The adjustment part 300 as a device such as a wireless terminal is not installed in the painting apparatus part 100 but communicates with the painting apparatus part 100 to adjust at least one of the location and the interval of the lane paint sprayed from the nozzle part 200. In this case, the adjustment part 300 provides at least one input button or provides a touch screen and the like to adjust at least one of the location and the interval of the lane paint sprayed from the nozzle part 200 according to input information input by a user.

The apparatus 10 of constructing the guide line of the road having the aforementioned configuration is implemented to paint the guide line 11 for the road formed by the directional mark 12 and the lane 13 for pre-indicating a route of a specific direction at a time to secure a stable ejection amount, thereby improving quality of the guide line 11 for the road.

Further, the lane 13 and the directional mark 12 to which the vehicle is gone may be painted at the same time, thereby shortening a construction time and a breaking time, minimizing inconvenience of the user, and reducing factors of workplace accidents.

Figure 3:
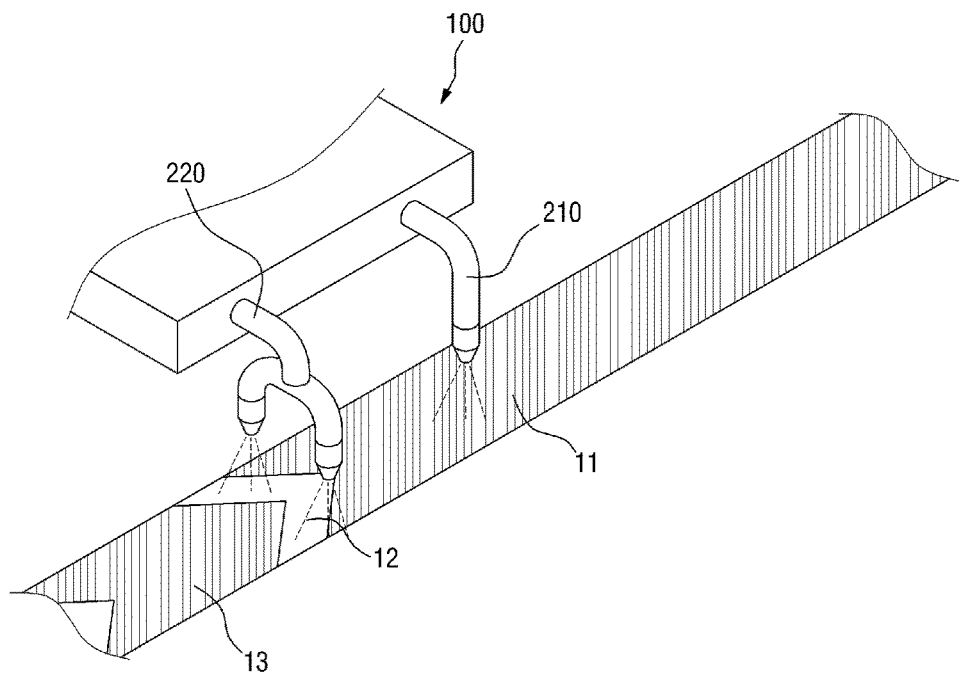
FIG. 3 is a diagram for describing a nozzle part in FIG. 1.

FIG. 3 is a diagram for describing the nozzle part in FIG. 1. Referring to FIG. 3, the nozzle part 200 includes a first nozzle member 210 and a second nozzle member 220.

The first nozzle member 210 is installed at one side of the painting apparatus part 100 and receives and sprays a first lane paint from the painting apparatus part 100 to form a lane 13. The first nozzle member 210 is provided with a rectangular tip at one end of the nozzle to spray the first lane paint so that both side edges of the lane 13 are not blurred and a straight line state is clear.

The first lane paint may be set by various colors (for example, pink, green, blue, and the like) according to a type of road (for example, a crossroad, a drowsy shelter, Hi-pass, etc.) on which the vehicle travels. The first lane paint further includes an axial light paint to indicate more effectively a progress direction to the driver passing the road at night.

The second nozzle member 220 is installed at the other side of the painting apparatus part 100 and receives a second lane paint from the painting apparatus part 100 and sprays the received second lane paint on the lane 13 to form the directional mark 12 and form the guide line 11 for the road. The second nozzle member 220 may form the directional mark 12 having a ">" shape or "<" shape. The second nozzle member 220 may provide at least two nozzles. The second nozzle member 220 is provided with a rectangular tip at one end of the nozzle to spray the second lane paint so that both side edges of the directional mark 12 are not blurred and the directional mark 12 is clear.

The second lane paint is sprayed with a different color from the first lane paint to indicate a progress direction of the vehicle and preferably, may be set to white. The second lane paint further includes an axial light paint to indicate more effectively a progress direction to the driver passing the road at night.

The nozzle part 200 has one or more first nozzle members 210 and second nozzle members 220 to form the guide line 11 for the road in a short time. The nozzle part 200 may uniformly fix an angle of the nozzle of the second nozzle member 220 so that a width of the first lane paint sprayed from the first nozzle member 210 and a width of the second lane paint sprayed from the respective nozzles of the second nozzle member 220 are the same as each other. The nozzle part 200 may rotate the nozzles of the second nozzle member 220, respectively, when the width of the first lane paint sprayed from the first nozzle member 210 and the width of the second lane paint sprayed from the respective nozzles of the second nozzle member 220 are not the same as each other.

The adjustment part 300 may preset an interval (that is, interval information) at which the second lane paint is sprayed from the second nozzle member 220 so that the directional mark 12 is formed at a predetermined interval. For example, the adjustment part 300 generates interval information for the corresponding interval when an interval at which the second lane paint is sprayed from the second nozzle member 220 is pre-set to 1 meter to transmit the generated interval information to the painting apparatus part 100. Thereafter, the painting apparatus part 100 transmits the second lane paint to the second nozzle member 220 whenever the painting apparatus part 100 moves by 1 meter according to the interval information received from the adjustment part 300, and as a result, the second nozzle member 220 sprays the second lane paint at an interval of 1 meter to form the directional mark 12. The adjustment part 300 may preset a time (that is, time information) at which the second lane paint is sprayed from the second nozzle member 220 so that the directional mark 12 is formed at a predetermined interval. For example, the adjustment part 300 generates time information for the corresponding time when the time at which the second lane paint is sprayed from the second nozzle member 220 is pre-set to 2 minutes to transmit the generated time information to the painting apparatus part 100. Thereafter, the painting apparatus part 100 transmits the second lane paint to the second nozzle member 220 at an interval of 2 minutes according to the time information received from the adjustment part 300, and as a result, the second nozzle member 220 sprays the second lane paint at an interval of 2 minutes to form the directional mark 12.

Figure 4:
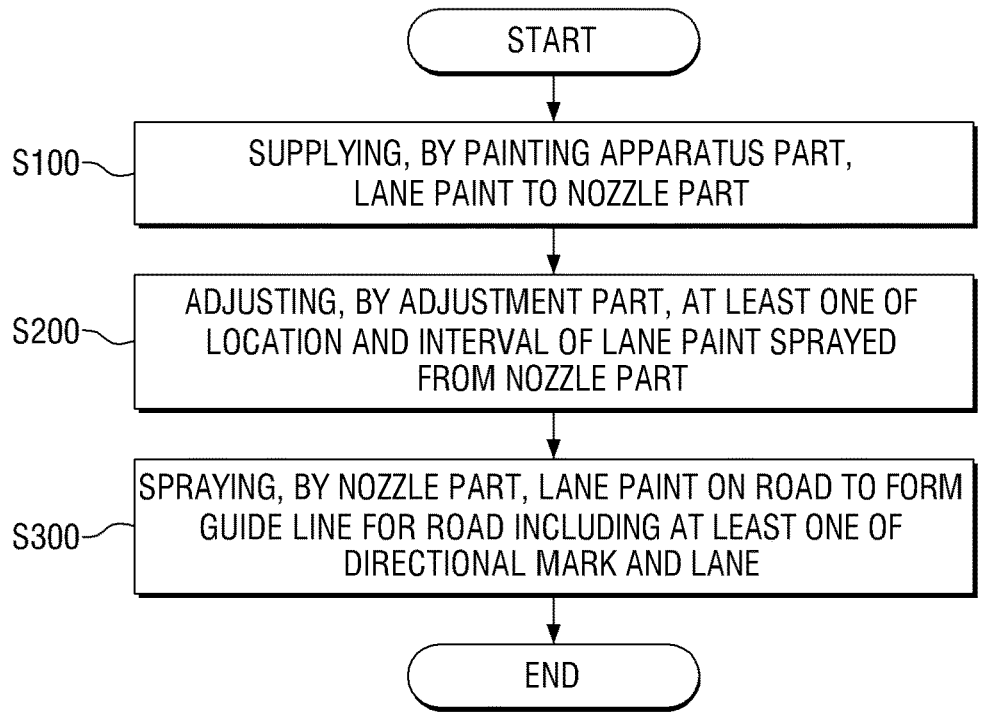
FIG. 4 is a flowchart for describing a method of constructing a guide line for a road according to an exemplary embodiment of the present disclosure.

FIG. 4 is a flowchart for describing a method of constructing a guide line for a road according to an exemplary embodiment of the present disclosure. Referring to FIG. 4, a method of constructing a guide line for a road includes a first step (S100), a second step (S200), and a third step (S300).

First, in the first step (S100), the painting apparatus part 100 is driven by receiving power to supply a lane paint to the nozzle part 200. In the first step (S100), the painting apparatus part 100 may store the lane paint for supplying to the nozzle part 200.

After the aforementioned step S100, in the second step (S200), the adjustment part 300 adjusts at least one of a location and an interval of the lane paint sprayed from the nozzle part 200. In the second step (S200), the adjustment part 300 may preset an interval at which the second lane paint is sprayed from the second nozzle member 220 so that the directional mark 12 is formed at a predetermined interval. In the second step (S200), the adjustment part 300 generates interval information in which the second lane paint is sprayed from the second nozzle member 220 to transmit the corresponding generated interval information to the painting apparatus part 100. In this case, the painting apparatus part 100 may supply the second lane paint to the second nozzle member 220 whenever the painting apparatus part 100 moves by a distance according to the interval information received from the adjustment part 300.

In the second step (S200), the adjustment part 300 may preset a time at which the second lane paint is sprayed from the second nozzle member 220 so that the directional mark 12 is formed at a predetermined interval. In the second step (S200), the adjustment part 300 generates time information in which the second lane paint is sprayed from the second nozzle member 220 to transmit the corresponding generated time information to the painting apparatus part 100. In this case, the painting apparatus part 100 may supply the second lane paint to the second nozzle member 220 at every time according to the time information received from the adjustment part 300.

After the aforementioned step S200, in the third step (S300), the nozzle part 200 sprays the lane paint supplied from the painting apparatus part 100 on the road to form the guide line 11 for the road including at least one of the directional mark 12 and the lane 13.

Figure 5:
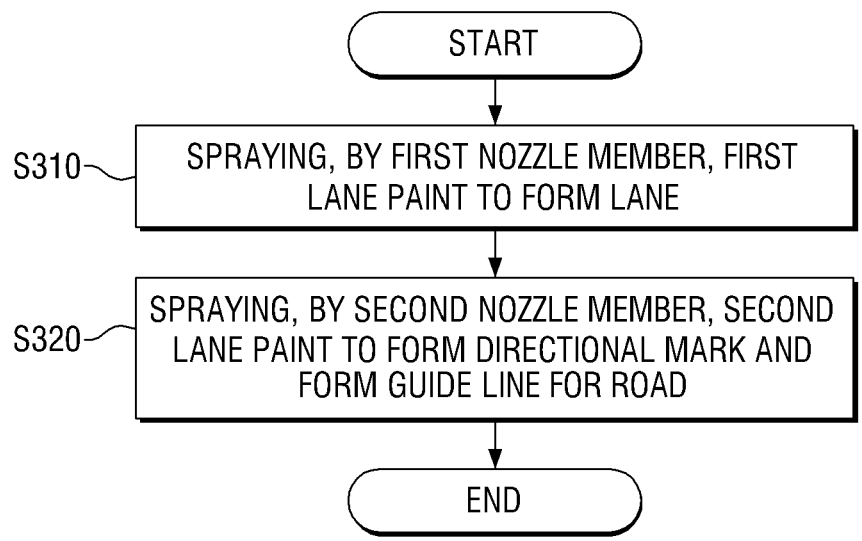
FIG. 5 is a flowchart for describing a third step in FIG. 4.
Figure 6:
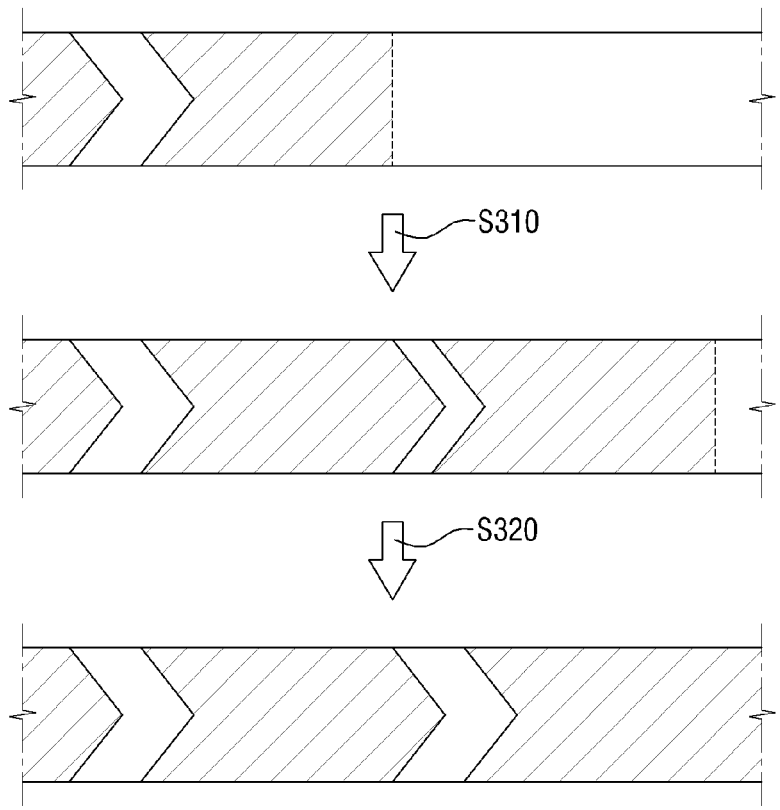
FIG. 6 is a diagram for describing the third step in FIG. 4.

FIG. 5 is a flowchart for describing the third step in FIG. 4 and FIG. 6 is a diagram for describing the third step in FIG. 4. Referring to FIGS. 5 and 6, the third step (S300) includes a step 3-1 (S310) and a step 3-2 (S320).

The nozzle part 200 may include a first nozzle member 210 (see FIG. 3) and a second nozzle member 220 (see FIG. 3).

In the step 3-1 (S310), the first nozzle member 210 sprays a first lane paint received from the painting apparatus part 100 to forma lane 13. In the step 3-1 (S310), the first nozzle member 210 is provided with a rectangular tip at one end of the nozzle of the first nozzle member 210 to spray the first lane paint so that both side edges of the lane 13 are not blurred and a straight line state is clear. In the step 3-1 (S310), when the painting apparatus part 100 is driven, the first nozzle member 210 sprays the first lane paint to form the lane 13.

The first lane paint may be set by various colors (for example, pink, green, blue, and the like) according to a type of road (for example, a crossroad, a drowsy shelter, Hi-pass, etc.) on which the vehicle travels. Alternatively, the first lane paint further includes an axial light paint to indicate more effectively a progress direction to the driver passing the road at night.

In the step 3-2 (S320), the second nozzle member 220 sprays the second lane paint to form a directional mark 12 and form a guide line 11 for a road. In the step 3-2 (S320), the second nozzle member 220 sprays the second lane paint to form a directional mark 12 having a ">" or "<" shape. In the step 3-2 (S320), the second nozzle member 220 may provide at least two nozzles.

In the step 3-2 (S320), the second nozzle member 220 is provided with a rectangular tip at one end of the nozzle of the second nozzle member 220 to spray the second lane paint so that both side edges of the directional mark 12 are not blurred and the directional mark 12 is clear. In the step 3-2 (S320), the second lane paint sprayed from the second nozzle member 220 further includes an axial light paint to indicate more effectively a progress direction to the driver passing the road at night.

As described above, the exemplary embodiment of the present disclosure is not implemented only by the above-described apparatus and/or operating method, but may be implemented by a program for realizing a function corresponding to the configuration of the exemplary embodiment of the present disclosure, a recording medium on which the program is recorded, and the like, and such an implementation can be easily implemented by those skilled in the art from the description of the exemplary embodiment described above. While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for constructing a guide line for a road, the apparatus comprising:
    a painting apparatus part that stores a lane paint, is driven by receiving power, and supplies the lane paint;
    a nozzle part that is installed in the painting apparatus part and sprays the lane paint supplied from the painting apparatus part to form a guide line for a road including at least one of a directional mark and a lane;
    the nozzle part comprising
        a first nozzle member that is installed at one side of the painting apparatus part and receives and sprays a first lane paint from the painting apparatus part to form the lane, and
        a second nozzle member that is installed at the other side of the painting apparatus part and receives a second lane paint from the painting apparatus part and sprays the second lane paint on the lane to form the directional mark and form the guide line for the road; and
    an adjustment part that is installed in the painting apparatus part and adjusts at least one of a location and an interval of the lane paint sprayed from the nozzle part;
    the adjustment part presetting an interval and a time at which the second lane paint is sprayed from the second nozzle member so that the directional mark is formed at a predetermined interval.

2. The apparatus of claim 1, wherein the second nozzle member forms the directional mark having a ">" or "<" shape.

3. The apparatus of claim 1, wherein the second nozzle member comprises at least two nozzles.

4. A method of constructing a guide line for a road, the method comprising:
    a first step in which a painting apparatus part is driven by receiving power to supply a lane paint to a nozzle part, the nozzle part comprising a first nozzle member and a second nozzle member;
    a second step in which an adjustment part adjusts at least one of a location and an interval of the lane paint sprayed from the nozzle part; and
    a third step in which the nozzle part sprays the lane paint supplied from the painting apparatus part on a road to form a guide line for a road including at least one of a directional mark and a lane;
    the third step comprising
        a step in which the first nozzle member sprays a first lane paint to form the lane, and
        a step in which the second nozzle member sprays a second lane paint to form the directional mark and form the guide line for the road;
    wherein the second step comprises the adjustment part presetting an interval and a time at which the second lane paint is sprayed from the second nozzle member so that the directional mark is formed at a predetermined interval.

* * * * *